US009198507B1

(12) United States Patent
Lau (10) Patent No.: US 9,198,507 B1
(45) Date of Patent: Dec. 1, 2015

(54) STAND FOR ADJUSTABLE DISPLAY (71) Applicant: RACER TECHNOLOGY PTE. LTD., Singapore (SG)

(72) Inventor: Choon Meng Lau, Singapore (SG)

(73) Assignee: RACER TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 14/402,286

(22) PCT Filed: Aug. 7, 2014

(86) PCT No.: PCT/SG2014/000376
§ 371 (c)(1),
(2) Date: Nov. 19, 2014

(51) Int. Cl.
*A47G 1/24* (2006.01)
*A47B 23/04* (2006.01)
*A47B 23/00* (2006.01)
*F16M 11/20* (2006.01)
*F16M 11/38* (2006.01)
*A47B 97/08* (2006.01)

(52) U.S. Cl.
CPC ............... *A47B 23/043* (2013.01); *A47B 23/00* (2013.01); *A47B 97/08* (2013.01); *F16M 11/2021* (2013.01); *F16M 11/38* (2013.01)

(58) Field of Classification Search
CPC .... A47B 23/043; A47B 23/042; A47B 23/04; A47B 23/044; A47B 97/08; F16M 11/10; F16M 11/38
USPC ......... 248/456, 446, 447, 454, 455, 457, 460, 248/462
See application file for complete search history.

(56) References Cited

U.S. PATENT DOCUMENTS 3,145,014 A    8/1964  Neuwirth
5,366,197 A *  11/1994 Westland ...................... 248/456
7,011,285 B2 * 3/2006  Wang et al. ................... 248/673
7,301,759 B2 * 11/2007 Hsiung .................... 361/679.27
(Continued)

FOREIGN PATENT DOCUMENTS

CN       85202430 U    3/1987
GB       412760        7/1934

OTHER PUBLICATIONS

Foreign Communication From a Related Counterpart Application, International Search Report dated Sep. 5, 2014, International Application No. PCT/SG2014/000376 filed on Aug. 7, 2014.
(Continued)

*Primary Examiner* — Anita M King (57) ABSTRACT

A stand for adjustable display comprising: a holder configured to support an item to be displayed on the stand, a bottom edge of the holder configured to contact a surface on which the stand is placed; and an adjustable support configured to be attached to the holder, the adjustable support comprising a supporting leg having a first end configured to engage the holder pivotably about a first axis and a second end configured to contact the surface on which the stand is placed; and an adjusting bar having a first end configured to engage the holder pivotably about a second axis and a second end configured to slidably engage the supporting leg and to pivotably engage the supporting leg about a third axis; wherein the supporting leg comprises a locking mechanism configured to lock the stand in a stationary position between and including a minimum raised position and a maximum raised position such that the second end of the adjusting bar remains stationary on the supporting leg when raising of a top edge of the holder is stopped.

12 Claims, 9 Drawing Sheets

(56) References Cited

U.S. PATENT DOCUMENTS

| | | | |
|---|---|---|---|
| 7,762,519 B2* | 7/2010 | Kunii et al. | 248/688 |
| 8,162,281 B2 | 4/2012 | Logue | |
| 8,413,943 B1* | 4/2013 | Li | 248/454 |
| 8,783,641 B2* | 7/2014 | Lin et al. | 248/463 |
| 2003/0001064 A1* | 1/2003 | Book | 248/460 |

OTHER PUBLICATIONS

Foreign Communication From a Related Counterpart Application, International Preliminary Report on Patentability dated Nov. 10, 2014, International Application No. PCT/SG2014/000376 filed on Aug. 7, 2014.

* cited by examiner

STAND FOR ADJUSTABLE DISPLAY

CROSS-REFERENCE TO RELATED APPLICATIONS

This application is a filing under 35 U.S.C. 371 as the National Stage of International Application No. PCT/SG2014/000376, filed Aug. 7, 2014, entitled "A STAND FOR ADJUSTABLE DISPLAY", which is incorporated herein by reference in its entirety for all purposes.

FIELD OF THE INVENTION

This invention relates to a stand for adjustable display, and particularly relates to a stand that is configured to adjustably display items such as electronic tablets, books, art work or music scores for viewing.

BACKGROUND OF THE INVENTION

When displaying items such as electronic tablets, books, art work or music scores, it is often desirable to prop them up for better viewing. Stands are available for doing so, and typically comprise a holder for resting the item on, and a support to keep the holder up. Different stand designs have their own drawbacks, and there is a need to provide a stand that is easy to set up according to users' preferred display angle, that is stable even when the item has a touchscreen that is frequently touched, and that can also be compactly stored.

SUMMARY OF INVENTION

According to an exemplary aspect, there is provided a stand for adjustable display comprising: a holder configured to support an item to be displayed on the stand, a bottom edge of the holder configured to contact a surface on which the stand is placed; and an adjustable support configured to be attached to the holder, the adjustable support comprising a supporting leg having a first end configured to engage the holder pivotably about a first axis and a second end configured to contact the surface on which the stand is placed; and an adjusting bar having a first end configured to engage the holder pivotably about a second axis and a second end configured to slidably engage the supporting leg and to pivotably engage the supporting leg about a third axis; wherein the supporting leg comprises a locking mechanism configured to lock the stand in a stationary position between and including a minimum raised position and a maximum raised position such that the second end of the adjusting bar remains stationary on the supporting leg when raising of a top edge of the holder is stopped.

The locking mechanism may comprise a ratchet provided in the supporting leg, the ratchet comprising a rack configured to slide between the first end of the supporting leg and the second end of the supporting leg, and wherein the second end of the adjusting bar is pivotably connected to the rack such that raising the top edge of the holder slides the rack forward towards the first end of the supporting leg and lowering the top edge of the holder slides the rack backward towards the second end of the supporting leg.

The ratchet may further comprise a pawl configured to engage a toothed segment of the rack such that the rack can move in only one direction when the pawl is at the toothed segment of the rack.

The pawl may be rotatably attached to the supporting leg such that when the pawl is at the toothed segment of the rack, the pawl is angled towards the first end of the supporting leg during raising of the top edge of the holder, and the pawl is angled towards the second end of the supporting leg during lowering of the top edge of the holder.

The first axis may be tangential to the holder and parallel to a surface on which the stand is placed.

The second axis may be parallel to and distanced apart from the first axis.

The third axis may be parallel to the first axis.

The adjustable support may further comprise a connecting piece to which the first end of the supporting leg and the first end of the adjusting bar are pivotably attached at a predetermined distance apart, the predetermined distance defining the distance between the first axis and the second axis, the connecting piece being configured to be immovably attached to the holder.

The adjustable support may be attached to the holder at a central portion of the back of the holder.

The stand may further comprise a footrest provided at the second end of the supporting leg, the footrest being wider than the supporting leg.

The holder may include a storable ledge configured for supporting the item thereon.

The holder may comprise a plurality of arms configured to be set up to form a frame-type holder and to be collapsed to minimize storage space taken up by the stand.

An angle of inclination of the stand in the stationary position between the minimum raised position and the maximum raised position may range between 30° and 70°

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIG. 8 (a) is an isometric view of the adjustable support at a stored position;

FIG. 8 (b) is an isometric view of a locking mechanism of the adjustable support at the stored position;

FIG. 8 (c) is a plan view of the locking mechanism of the adjustable support at the stored position;

FIG. 11 (c) is an isometric view the adjustable support at the final release position

DETAILED DESCRIPTION

Exemplary embodiments of the invention will be described with reference to FIGS. 1 to 15.

Figure 1:
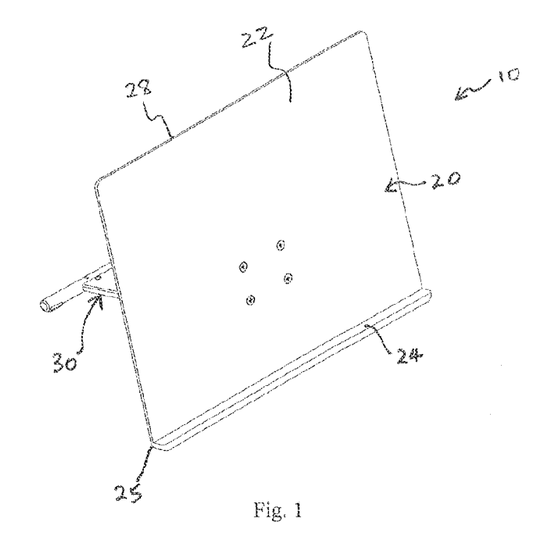
FIG. 1 is an isometric front view of a first exemplary embodiment of a stand of the present invention.
Figure 2:
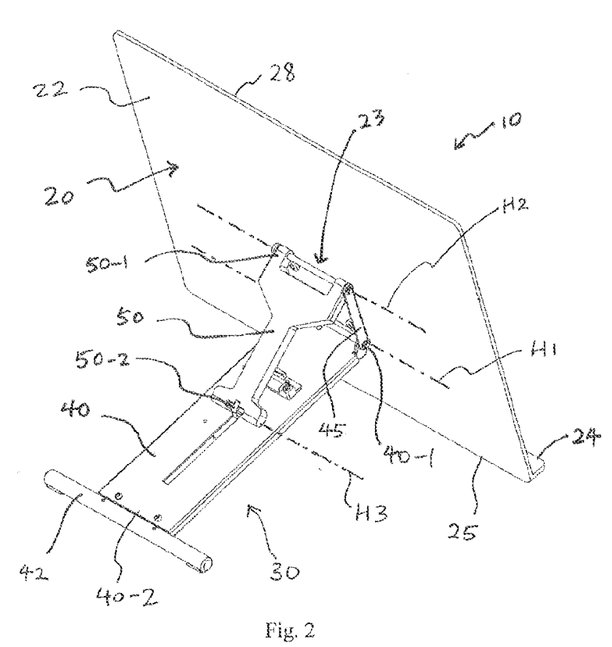
FIG. 2 is an isometric rear view of the stand of FIG. 1.

The stand 10 comprises a holder 20 configured for supporting an item such as a tablet or smart phone to be displayed thereon, and an adjustable support 30 configured for adjustably supporting the holder 20. In FIG. 6 and FIGS. 8a to 12, the holder 20 is not shown for better clarity of the adjustable support 30. In one embodiment, as shown in FIGS. 1 and 2, the holder 20 comprises a panel 22 having a ledge 24 for resting the item thereon. The ledge 24 is preferably attached to a bottom edge 25 of the panel 22. In use, the bottom edge 25 of the holder 20 rests on a surface 90 on which the stand 10 is placed. Elevation of a top edge 28 of the holder 20 is adjustable in order to adjust an angle of inclination of the holder 20, and according the angle of display of the item on the holder 20.

The holder 20 is configured to engage the adjustable support 30 at an attachment area 23 at the back of the holder 20. The attachment area 23 is preferably at a central portion of the holder 20. Compared to existing stands where the holder 20 is supported only at the bottom edge 25 of the holder 20, engaging the holder 20 at a central portion of the holder 20 improves the rigidity of the holder 20, thereby minimizing shaking or vibrating of the item on the stand 10, particularly if the item has a touch screen so that a user touches the item on the stand 10 during use.

The adjustable support 30 comprises a supporting leg 40 that is configured to engage the holder 20 pivotably, about a first axis H1. The first axis H1 is preferably tangential to the holder 20 and parallel to the surface 90 on which the stand 10 is placed. In the exemplary embodiment, as can be seen in FIG. 2, this is achieved by having a first end 40-1 of the supporting leg 40 being attachable to the holder 20 via a hinge at the attachment area 23 on the holder 20. A second end 40-2 of the supporting leg 40 is free to contact the surface 90 on which the stand 10 is placed. A footrest 42 is preferably provided at the second end 40-2 of the supporting leg 40. The footrest 42 is preferably wider than the supporting leg 40 in order to give greater stability to the stand 10 when in use.

The adjustable support 30 further comprises an adjusting bar 50 that is configured to engage the holder 20 pivotably about a second axis H2. The second axis H2 is preferably parallel to and distanced apart from the first axis H1. The adjusting bar is also configured to slidably and pivotably engage the supporting leg 40. The adjusting bar 50 pivotably engages the supporting leg 40 about a third axis H3. The third axis H3 is preferably parallel to the first axis H1. In the exemplary embodiment, as can be seen in FIG. 2, this is achieved by having a first end 50-1 of the adjusting bar 50 being attachable to the holder 20 via a hinge at the attachment area 23 on the holder 20. A second end 50-2 of the adjusting bar 50 is configured to slidably engage the supporting leg 40 at the adjusting bar 50, between the first end 40-1 and the second end 40-2 of the supporting leg 40.

The stand 10 is configured such that when the supporting leg 40 and the adjusting bar 50 are attached to the holder 20, the first end 50-1 of the adjusting bar 50 is distanced apart from and located above the first end 40-1 of the supporting leg 40 on the holder 20, that is, the second axis H2 is located above and distanced apart from the first axis H1. In this way, raising the top edge 28 of the holder 20, i.e., moving the top edge 28 away from the second end 40-2 of the supporting leg, slides the second end 50-2 of the adjusting bar 50 towards the first end 40-1 of the supporting leg 40, while lowering the top edge 28 of the holder 20, i.e., moving the top edge 28 towards the second end 40-2 of the supporting leg 40, slides the second end 50-2 of the adjusting bar 50 towards the second end 40-2 of the supporting leg 40, thereby allowing adjustment of an angle of inclination $\alpha$ of the holder 20 with reference to the surface 90.

While the second end 50-2 of the adjusting bar 50 slides along the supporting leg 40, the adjusting bar 50 pivots about the third axis H3. It should thus be noted that the first axis H1 and the second axis H2 remain immovable relative to the bottom edge 25 of the holder 20, while the third axis H3 is moved either forward towards the first end 40-1 or backward toward the second end 40-2 of the supporting leg 40 when raising or lowering the top edge 28 of the holder 20 respectively.

In the exemplary embodiment as shown in the figures, the adjustable support 30 preferably further comprises a connecting piece 45 to which the first end 40-1 of the supporting leg 40 and the first end 50-1 of the adjusting bar 50 are pivotably attached at a predetermined distance apart. This predetermined distance defines the distance between the first and second axes H1, H2 described above. The supporting leg 40 and the adjusting bar 50 are pivotably attached to the holder 20 via the connecting piece 45 by immovably attaching the connecting piece 45 to the holder 20 at the attachment area 23. In the figures, the connecting piece 45 is shown as a simple rectangular piece that is attached to the holder 20 by means of simple screws. In alternative embodiments, the connecting piece 45 may comprise any other shape or form and may be attached to the holder by any suitable means so long as the first end 40-1 of the supporting leg 40 and the first end 50-1 of the adjusting bar 50 can be attached to the connecting piece 45 to pivot about the immovable first and second axes H1, H2.

A locking mechanism 60 is comprised in the supporting leg 40, between a top casing 41 and a bottom casing 43 of the supporting leg 40. The locking mechanism 60 can be seen in FIGS. 8(b) to 11(b) and FIG. 12 where the top casing 41 has been hidden. The locking mechanism 60 is configured to lock the stand 10 in a stationary position between and including a minimum raised position and a maximum raised position when raising of the top edge 28 and sliding of the adjusting bar 50 towards the first end 40-1 of the supporting leg 40 is stopped, such that the second end 50-2 of the adjusting bar 50 remains stationary on the supporting leg 40, as shown in FIGS. 1, 2, 4 and 5.

Figure 9:
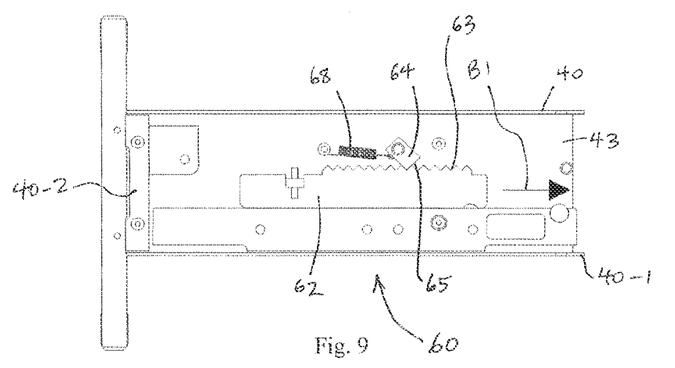
FIG. 9 is a plan view of the locking mechanism at a raised position.
Figure 10:
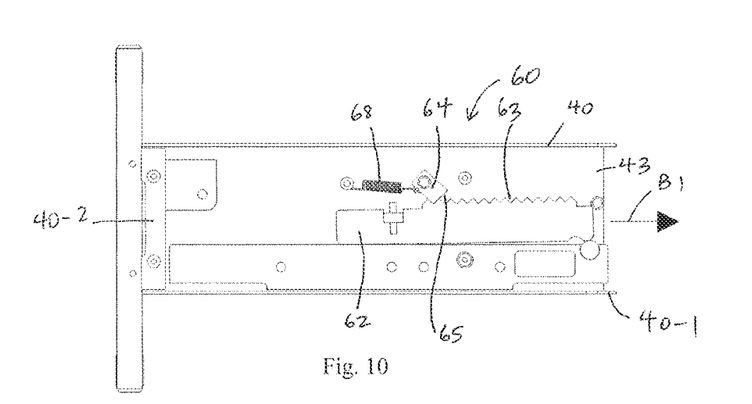
FIG. 10 is a plan view of the locking mechanism at a maximum raised position.
Figure 11A:
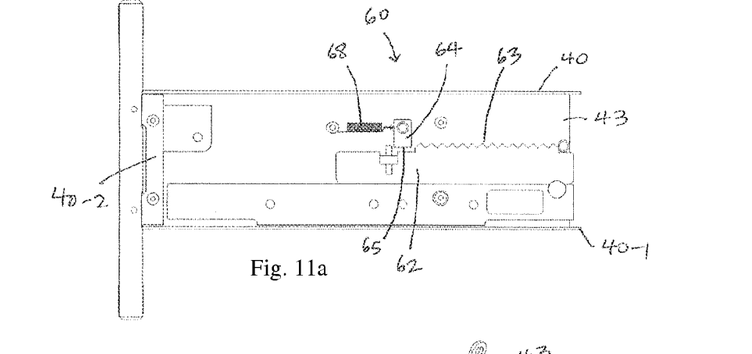
FIG. 11(a) is a plan view of the locking mechanism at a final release position.
Figure 11B:
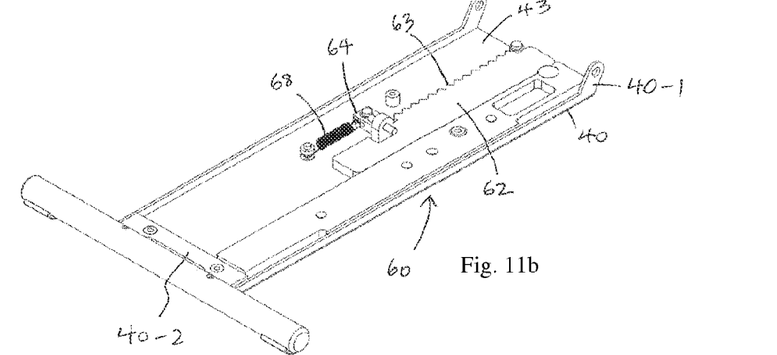
FIG. 11(b) is an isometric view of the locking mechanism at the final release position.
Figure 11C:
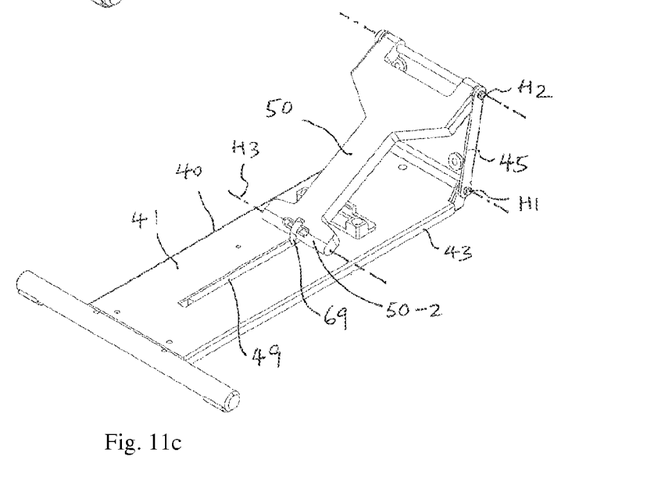

The locking mechanism 60 comprises a ratchet having a linear rack 62 and a pawl 64 as shown in FIGS. 8(b) to 11(b) and FIG. 12. The rack 62 is configured to slide within the supporting leg 40 between the first end 40-1 and the second end 40-2 of the supporting leg 40. The rack 62 has a protruding toothed segment 63 along one edge of the rack 62. The toothed segment 63 has a plurality of uniform and symmetrically sloped teeth. As mentioned above, the adjusting bar 50 pivotably engages the supporting leg 40 about a third axis H3. This is achieved by rotatably connecting the second end 50-2 of the adjusting bar 50 to the slidable rack 62 in the supporting leg 40. A connector 69 is provided on the rack 62 to rotatably connect the rack 62 with the second end 50-2 of the adjusting bar 50. As shown in FIGS. 2 and 11 (c), the top casing 41 of the supporting leg 40 is provided with a slot 49 to allow passage of the connector 69 therethrough in order for the rack 62 to be connected to the adjusting bar 50 while the rack 62 remains hidden under the top casing 41.

The pawl 64 has a rectangular lockable end 65 configured to engage the teeth of the rack 62. The pawl 64 is rotatable about a pivot 66 and is biased by a spring 68 towards a central position as shown in FIGS. 8(b), 8(c), 11(a) and 11(b). In the central position, when the pawl 64 is not somewhere along the toothed segment 63 of the rack 62 (as shown in FIGS. 8(c), 11(a) and 11(b)), the lockable end of the pawl 65 is oriented neutrally such that it is not angled towards either the first end 40-1 or the second end 40-2 of the supporting leg 40. When the pawl 64 engages the tooth segment 63, the lockable end 65 will be angled towards either the first end 40-1 or the second end 40-2 of the supporting leg 40 depending on which phase the stand 10 is at, as will be further described below. The rack 62 and pawl 64 are configured such that the rack 62 can move in only one direction when the pawl 64 is at the toothed segment 63 of the rack 62.

Figure 3:
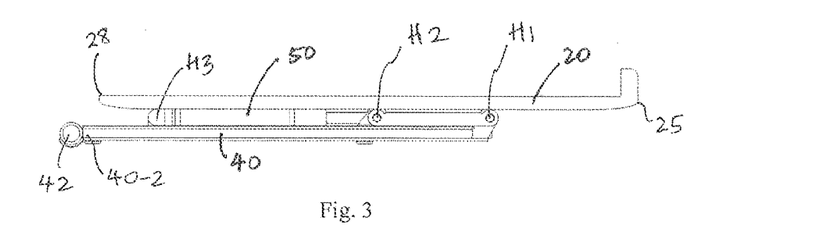
FIG. 3 is a side view of an adjustable support of the stand at a stored position.
Figure 8A:
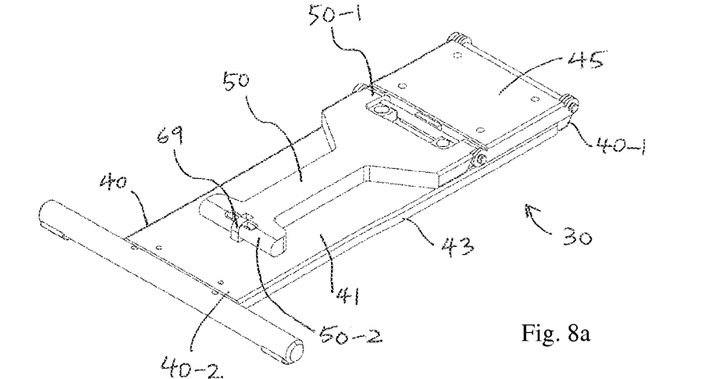
Figure 8B:
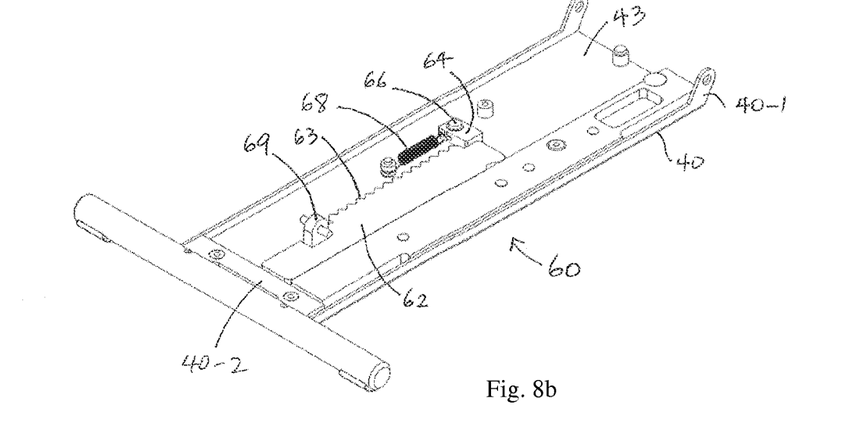
Figure 8C:
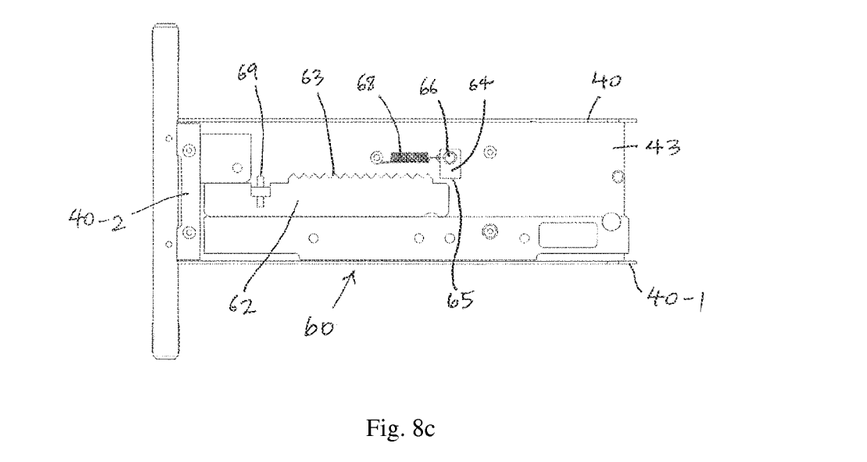

When the stand 10 is in a stored position as shown in FIGS. 3 and 8(a), the holder 20 (not shown in FIG. 8(a)), the supporting leg 40 and the adjusting bar 50 preferably lie parallel adjacent to each other, so as to minimize space taken up by the stored stand 10. In the stored position, as shown in FIGS. 8(b) and 8(c), the rack 62 is at an extreme backward position, at the second end 40-2 of the supporting leg 40 such that the toothed segment 63 is not in contact with the pawl 64. Besides the stored position, the stand 10 may be in either a raising phase or a lowering phase.

Figure 4:
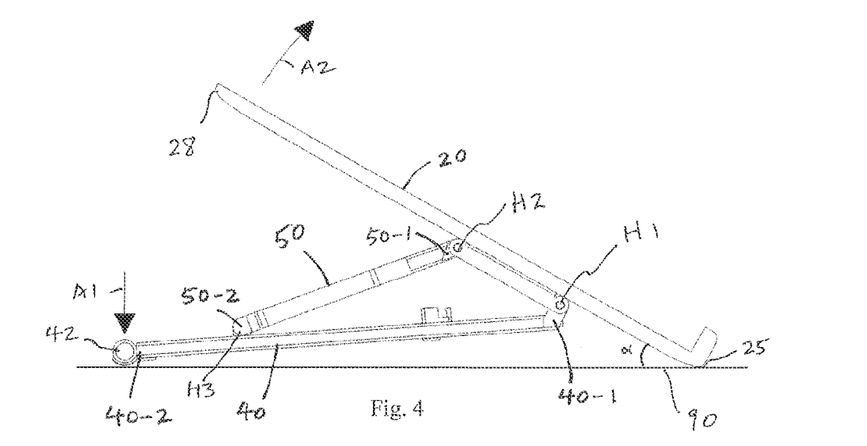
FIG. 4 is a side view of the adjustable support at a minimum raised position.

In the raising phase, that is, during setting up of the stand 10 for use, to increase the angle of inclination α of the holder 20 with reference to the surface 90, a downward force A1 is applied to the second edge 40-2 or footrest 42 while an upward force A2 is applied to the top edge 28 of the holder 20 (as shown in FIG. 4), thereby raising the top edge 28 of the holder 20 while the bottom edge 25 of the holder 20 remains in contact with the surface 90. As the top edge 28 of the holder 20 is raised, the second end 50-2 of the adjusting bar 50 slides along the supporting leg 40 towards the first end 40-1 of the supporting leg 40, thereby moving the rack 62 forward, towards the first end 40-1 of the supporting leg 40.

Continued application of the forces A1 and A2 will result in a first click being heard, indicating that the holder 20 has been inclined to a minimum raised position as shown in FIG. 4. In the minimum raised position, when the forces A1 and A2 cease to be applied, gravity acting on the holder 20 and the adjusting bar 30 tends to push the rack 62 backwards, towards the second end 40-2 of the supporting leg 40. However, the lockable end 65 of the pawl 64 is in engagement with a foremost tooth (nearest the first end 40-1 of the supporting leg 40) along the toothed segment 63 of the rack 62, resisting backward movement of the rack 62, so that the stand 10 remains stationary with the holder 20 at a minimum stationary angle of inclination. In this position, the lockable end 65 is angled towards the first end 40-1 of the supporting leg 40, thereby opposing backward movement of the rack 62.

Further application of the forces A1 and A2 after the minimum raised position has been reached increases the angle of inclination α beyond the first stationary angle of inclination. Doing so moves the rack 62 forward, closer to the first end 40-1 of the supporting leg 40 as indicated by the arrow B1 (shown in FIG. 9) while the lockable end 65 remains angled towards the first end 40-1 of the supporting leg 40.

If the forces A1 and A2 cease to be applied while the pawl 64 is somewhere along the toothed segment 63 (as shown in FIG. 9) in the raising stage, the lockable end 65 of the pawl 64 engages a tooth on the toothed segment 63 at an angle towards the first end 40-1 of the supporting leg 40. This prevents the rack 62 from being able to move backwards, thereby locking the adjusting bar 50 on the supporting leg 40. The stand 10 is thus kept stationary at a mid-way raised position.

Figure 5:
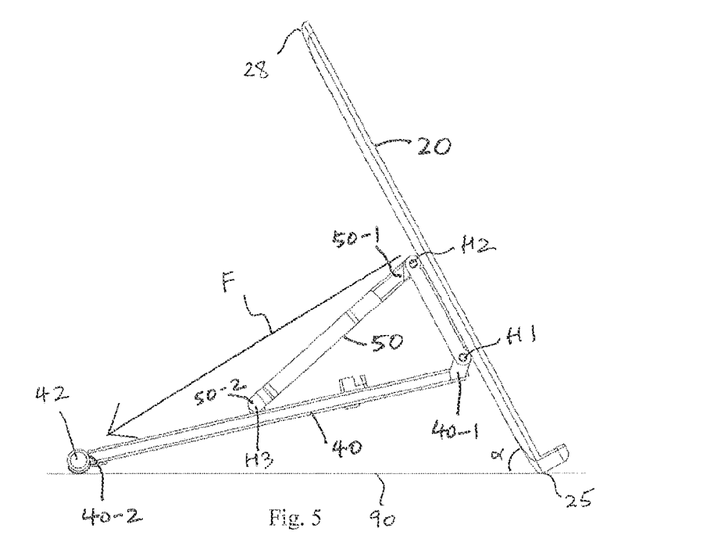
FIG. 5 is a side view of the adjustable support at a maximum raised position.
Figure 6:
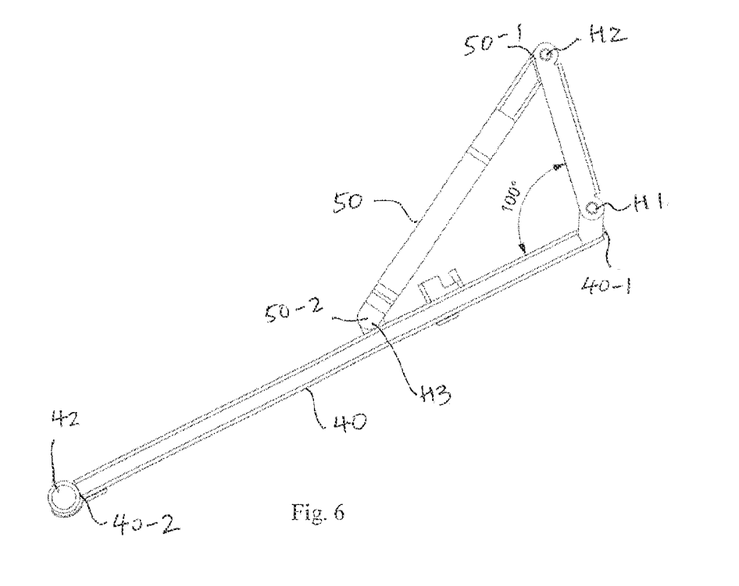
FIG. 6 is a side view of the adjustable support at a final release position.

With further application of the forces A1 and A2, a maximum raised position is reached as shown in FIG. 5. In the maximum raised position, the lockable end 65 of the pawl 64 engages a rearmost tooth (nearest the second end 40-2 of the supporting leg 40) along the toothed segment 63 of the rack 62 (as shown in FIG. 10) such that when the forces A1 and A2 cease to be applied, the stand 10 remains stationary with the holder 20 at a maximum stationary angle of inclination.

Thus, when the top edge 28 of the stand 10 is being raised between the minimum raised position (shown in FIG. 4) and the maximum raised position (shown in FIG. 5), stopping the raising of the top edge 28 results in the stand 10 remaining stationary with the holder 20 at a mid-way angle of inclination, between the minimum stationary angle of inclination and the maximum stationary angle of inclination, with the locking mechanism in a position as shown in FIG. 9. In the envisaged embodiment, the minimum stationary angle of inclination is 30° while the maximum stationary angle of inclination is 75°, although the stand 10 may alternatively be configured to provide other ranges of minimum and maximum inclination of the holder 20 between 0° and 90°.

It should be noted that whenever the stand 10 is in a stationary position, a force F acts on the holder 10 as shown in FIG. 5. This force F comprises a component of the weight of the holder 20 and the adjusting bar 50 and a component of the weight of an item (if any) placed on the stand 10. The force F is transmitted to the second end 40-2 or footrest 42 of the supporting leg 40 due to the first end 50-1 of the adjusting bar 50 being attached to a central part 23 of the holder 20.

Further application of the forces A1 and A2, i.e., raising of the top edge 28 after the maximum raised position is reached increases the angle of inclination α to a final angle beyond the maximum stationary angle of inclination, where a final release position is reached, as shown in FIG. 11(c). In the exemplary embodiment shown in FIG. 6, the final angle at the final release position is 100°. In the final release position, as shown in FIGS. 11(a) and (b), the rack 62 is at an extreme forward position, at the first end 40-1 of the supporting leg 40, such that the toothed segment 63 is no longer in contact with the pawl 64.

The raising phase is therefore a phase wherein the rack 62 can move only in a direction from the second end 40-2 to the first end 40-1 of the supporting leg 40, and wherein ceasing to raise the top edge 28 of the stand 10 when the pawl 64 is somewhere along the toothed segment 63 of the rack 62 results in the stand 10 remaining in a stationary raised position.

Figure 7:
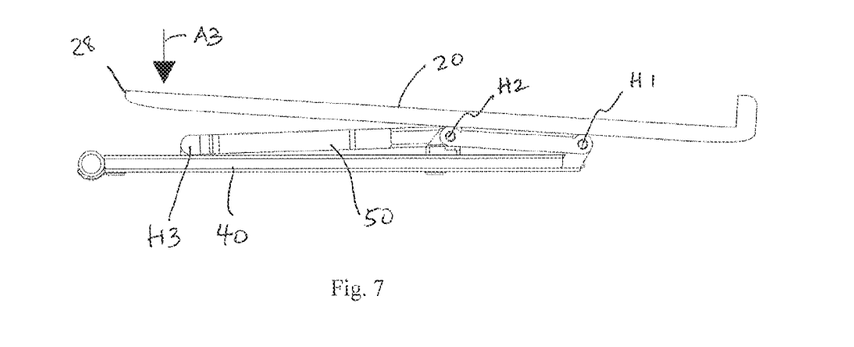
FIG. 7 is a side view of the adjustable support at a lowered position.
Figure 12:
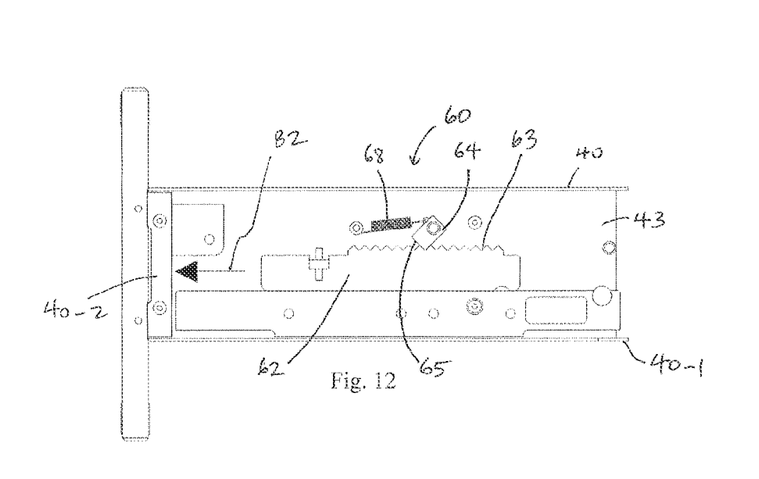
FIG. 12 is a plan view of the adjustable support at a returning position.

The lowering phase begins when the stand 10 is in the final release position as shown in FIG. 11(c). In the lowering phase, when the forces A1 and A2 cease to be applied, gravity acting on the holder 20 and the adjusting bar 30 tends to push the rack 62 backwards. As the pawl 64 is no longer in contact with the rack 62, the rack can now move backwards in the direction of the arrow B2 as shown in FIG. 12, thereby pushing the lockable end 65 of the pawl 64 to become angled towards the second end 40-2 of the supporting leg 40. This allows the rack 62 to continue moving backwards as the lockable end 65 of the pawl 64 is no longer opposing backward movement of the rack 62. Without the force A2 acting on the top edge 28, in the lowering phase, the stand 10 cannot remain stationary, and the top edge 28 will fall back down under the force of gravity, i.e., the holder 20 will lose its angle of inclination and fall to a lowered position as shown in FIG. 7. In the lowered position, application of a downward force A3 to the top edge 28 of the holder 20 will return the stand 10 to the stored position as shown in FIG. 3.

Figure 13A:
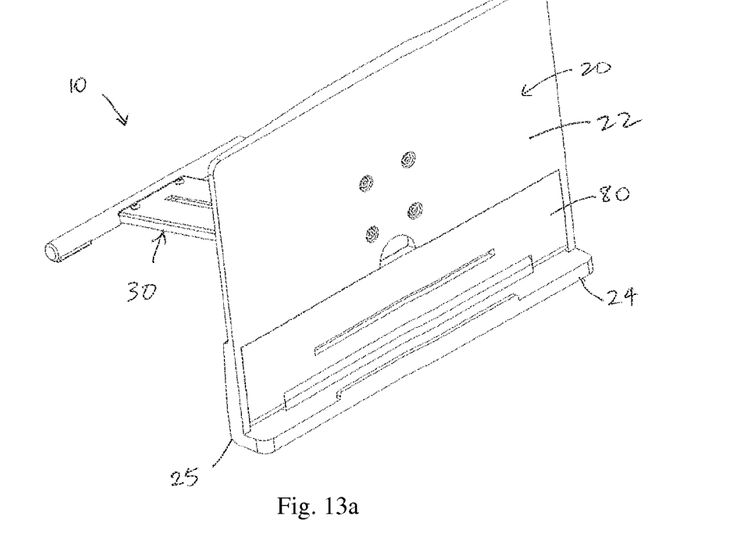
FIGS. 13a and 13b are isometric views of a second exemplary embodiment of the stand.
Figure 13B:
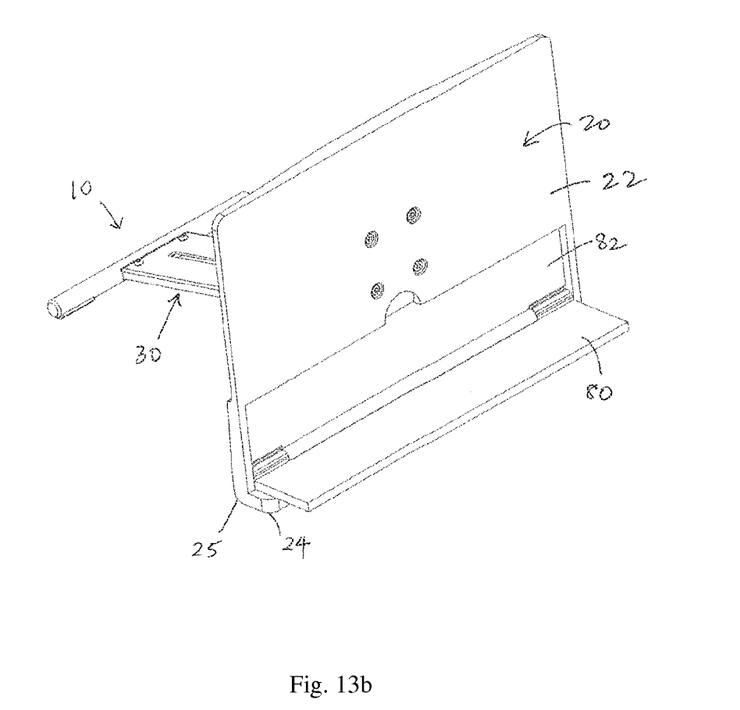

In a second exemplary embodiment of the stand 10, as shown in FIG. 13, the holder 20 may be provided with a storable ledge 80 in addition to the ledge 24. The storable ledge 80 is configured to be wider than the ledge 24, in order for the holder 20 to be able to support a thicker item such as a book, as well as being able to support a tablet or smart phone on the ledge 24. The storable ledge 80 is preferably hinged adjacent the bottom edge of the panel 22 and a recess 80 may be provided in the panel 22 to accommodate the storable ledge 80 within the panel 22 when the storable ledge 80 is not in use (as shown in FIG. 13(a)) so as not to cause any obstruction on the holder 20. In this embodiment, the storable ledge 80 may be said to have a flip-down configuration.

Figure 14A:
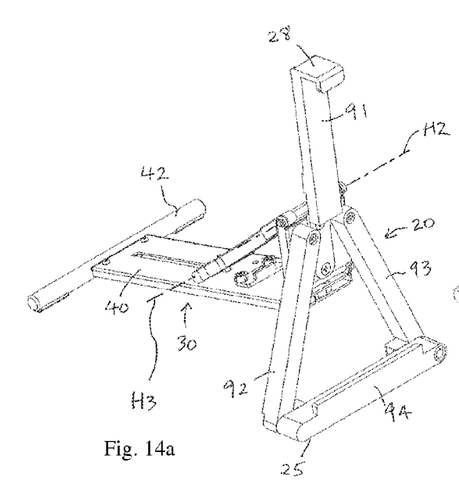
FIGS. 14a, 14b, and 14c are isometric views of a third exemplary embodiment of the stand.
Figure 14B:
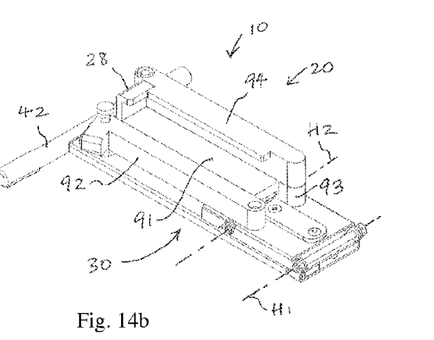
Figure 14C:
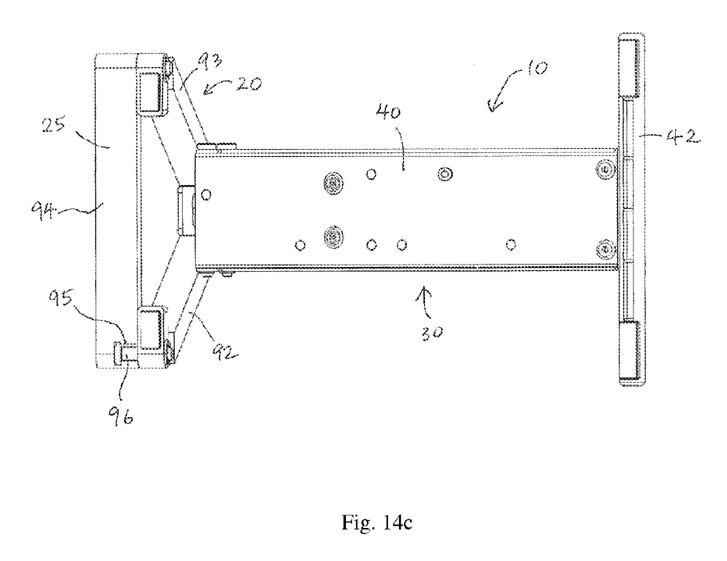
Figure 15A:
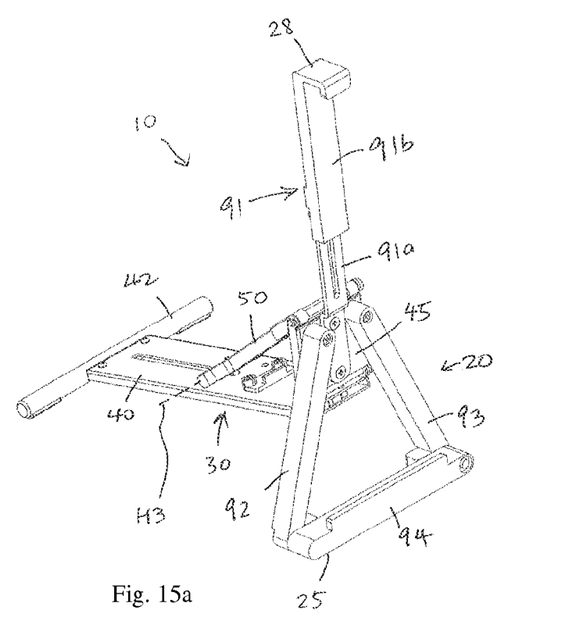
FIGS. 15a and 15b are isometric views of an alternative configuration of the stand of FIG. 14.
Figure 15B:
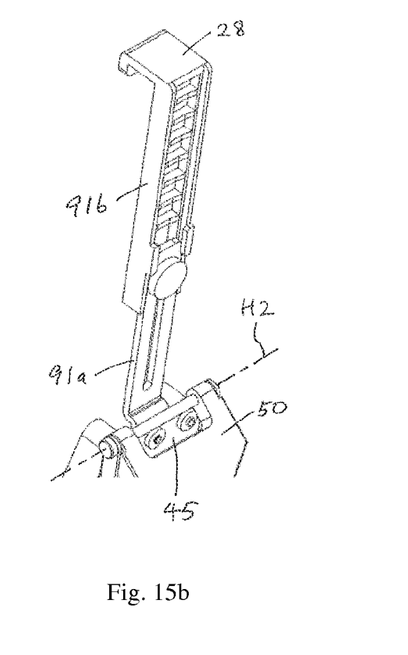

In a third exemplary embodiment of the stand 10, as shown in FIGS. 14 and 15, the holder 20 of the stand 10 may, instead of a panel 22, comprise a plurality of arms that may be set up to form a frame-type holder 20 (as shown in FIG. 14(a)) or collapsed compactly to minimize storage space taken up by the stand 10 (as shown in FIG. 14(b)). The holder 20 shown comprises one fixed arm 91, two rotatable arms 92, 93 and a rotatable ledge 94. The fixed arm 91 is fixedly attached to and projects centrally upward from the connecting piece 45. One end of each rotatable arm 92, 93 is rotatably attached to the connecting piece 45 on each side of the fixed arm 91, allowing a free end of each rotatable arm 92, 93 to be positioned to contact the surface 90 at an angle outwardly away from the fixed arm 91. As can be seen in FIG. 14(c), one end of the rotatable ledge 94 is rotatably attached to the free end of one of the rotatable arms 93 while a free end of the storable ledge 94 comprises a recess 95. A knob 96 is provided at the free end of the other rotatable arm 94 to engage the recess 95 such that the rotatable ledge 94 forms the base of an isosceles triangle having the two rotatable arms 93, 94 for its two equal sides when the knob 96 is engaged in the recess 95. The top edge 28 of the holder 20 is located at a top end of the fixed arm 91, and may be extended with respect to the connecting piece 45 to accommodate larger items on the stand 10, as shown in FIG. 15(a). A close-up rear view of the fixed arm 91 shows how the fixed arm 91 may comprises an immovable part 91a that is attached to the connecting piece 45 and a moveable part 91b that is configured to slidably and lockably engage the immovable part 91a, in order to allow the top edge 28 to be extended or retracted from the connecting piece 45 accordingly. In this embodiment, the rotatable ledge 94 may also be said to be a storable ledge 94 since it can be rotated out of the way together with the arms 92, 93 when collapsing the holder 20.

The stand 10 as described in the various embodiments above thus provides an adjustable and stable support as a general purpose display stand for items such as PC tablets, smart phones, digitizers, books, pictures and so on. The stand 10 can be customised by changing the dimensions and size of its various parts during production. By providing a locking mechanism comprising the ratchet and pawl, a greater number of teeth provided on the toothed segment of the ratchet results in a greater number of possible angles of display that are available for a user to adjust the stand to. Thus, very fine adjustments to the angle of display may be made to suit any users' preference since the toothed segment of the rack would typically comprise a sizeable number of teeth, easily more than ten. Appreciably, the stand 10 can be folded compactly to take up minimum space when not in use.

While there has been described in the foregoing description exemplary embodiments of the present invention, it will be understood by those skilled in the technology concerned that many variations in details of design, construction and/or operation may be made without departing from the present invention. For example, if the rack 62 is configured such that there is a considerable space between the pawl 64 and the toothed segment 63 of the rack 62 when the rack 62 is at the extreme backward position, then during the raising phase, when the top edge 28 of the stand 10 is being raised, before the minimum raised position is reached, that is, between the stored position and the minimum raised position, removing the forces A1 and A2 will result in the top edge 28 falling back down under the force of gravity, i.e., the holder 20 will lose its angle of inclination, as the rack 62 has not been moved sufficiently forward to allow the pawl 64 to engage the first tooth on the rack 62 at the minimum raised position. Although the holder in the first and second exemplary embodiments have been shown to be in the form of a generally rectangular panel, the holder can have many other possible configurations that are nevertheless capable of supporting an item to be displayed on the stand, for example, as a semi-circular panel, or any other fancy shaped panel.

The invention claimed is:

1. A stand for adjustable display comprising:
a holder configured to support an item to be displayed on the stand, a bottom edge of the holder configured to contact a surface on which the stand is placed; and
an adjustable support configured to be attached to the holder, the adjustable support comprising:
a supporting leg having a first end configured to engage the holder pivotably about a first axis and a second end configured to contact the surface on which the stand is placed; and
an adjusting bar having a first end configured to engage the holder pivotably about a second axis and a second end configured to slidably engage the supporting leg and to pivotably engage the supporting leg about a third axis;
wherein the supporting leg comprises a locking mechanism configured to lock the stand in a stationary position between and including a minimum raised position and a maximum raised position such that the second end of the adjusting bar remains stationary on the supporting leg when raising of a top edge of the holder is stopped;
wherein the locking mechanism comprises a ratchet provided in the supporting leg, the ratchet comprising a rack configured to slide between the first end of the supporting leg and the second end of the supporting leg, and wherein the second end of the adjusting bar is pivotably connected to the rack such that raising the top edge of the holder slides the rack forward towards the first end of the supporting leg and lowering the top edge of the holder slides the rack backward towards the second end of the supporting leg.

2. The stand of claim 1, wherein the ratchet further comprises a pawl configured to engage a toothed segment of the rack such that the rack can move in only one direction when the pawl is at the toothed segment of the rack.

3. The stand of claim 2, wherein the pawl is rotatably attached to the supporting leg such that when the pawl is at the toothed segment of the rack, the pawl is angled towards the first end of the supporting leg during raising of the top edge of the holder, and the pawl is angled towards the second end of the supporting leg during lowering of the top edge of the holder.

4. The stand of claim 1, wherein the first axis is tangential to the holder and parallel to a surface on which the stand is placed.

5. The stand of claim 1, wherein the second axis is parallel to and distanced apart from the first axis.

6. The stand of claim 1, wherein the third axis is parallel to the first axis.

7. The stand of claim 1, wherein the adjustable support further comprises a connecting piece to which the first end of the supporting leg and the first end of the adjusting bar are pivotably attached at a predetermined distance apart, the predetermined distance defining the distance between the first axis and the second axis, the connecting piece being configured to be immovably attached to the holder.

8. The stand of claim 1, wherein the adjustable support is attached to the holder at a central portion of the back of the holder.

9. The stand of claim 1, further comprising a footrest provided at the second end of the supporting leg, the footrest being wider than the supporting leg.

10. The stand of claim 1, wherein the holder includes a storable ledge configured for supporting the item thereon.

11. The stand of claim 1, wherein the holder comprises a plurality of arms configured to be set up to form a frame-type holder and to be collapsed to minimize storage space taken up by the stand.

12. The stand of claim 1, wherein an angle of inclination of the stand in the stationary position between the minimum raised position and the maximum raised position ranges between 30° and 70°.

\* \* \* \* \*